United States Patent [19]
Chiu et al.

[11] Patent Number: 5,670,976
[45] Date of Patent: Sep. 23, 1997

[54] SPATIAL LIGHT MODULATOR HAVING REDUNDANT MEMORY CELLS

[75] Inventors: Edison H. Chiu, Richardson, Tex.; Shigeki Numaga; Takeshi Honzawa, both of Ibaraki-ken, Japan

[73] Assignee: Texas Instruments Incorporated, Dallas, Tex.

[21] Appl. No.: 395,545

[22] Filed: Feb. 28, 1995

[51] Int. Cl.⁶ ..................... G09G 3/34
[52] U.S. Cl. ..................... 345/84; 365/200
[58] Field of Search ............. 345/84, 93, 190, 345/200, 85; 348/571, 771; 365/200; 371/10.3

[56] References Cited

U.S. PATENT DOCUMENTS

| | | | |
|---|---|---|---|
| 5,061,049 | 10/1991 | Hornbeck | 359/224 |
| 5,079,544 | 1/1992 | DeMond et al. | 340/701 |
| 5,105,369 | 4/1992 | Nelson | 364/525 |
| 5,278,652 | 1/1994 | Urbanus | 348/571 |
| 5,471,427 | 11/1995 | Muzakami et al. | 365/200 |

FOREIGN PATENT DOCUMENTS 0610665  8/1994  European Pat. Off. ......... G09G 3/34

Primary Examiner—Andrew Faile
Assistant Examiner—Andrew B. Christensen
Attorney, Agent, or Firm—Robert C. Klinger; James C. Kesterson; Richard L. Donaldson

[57] ABSTRACT

A spatial light modulator (10) of the DMD type having an array of memory cells (16) controlling an array of pixels (12). The memory cell array (16) has several integral, interleaved spare rows of memory cells MR (R1), MR (R2), and MR (R3), which can be selectively utilized to replace a defective row of primary memory cells. A fused row address mapping logic circuit (40) includes a network of fuses (F0–F12) and controls the implementation of memory cells, as well as the mapping of address signals to the memory cells as a function of inputs (R0–R11) received from a row decoder circuit (20). This circuit (40) is transparent to the row address decoder circuit (20). The present invention is suitable for large spatial light modulators compatible with high definition television (HDTV). High yield devices can be obtained with the present invention.

21 Claims, 7 Drawing Sheets

FIG. 4

| MEMORY CELL ROW | NORMAL OPERATION REDUNDANCY CELL ROW NOT USED | | | | ADDRESSED ROW OF ELECTRODE PAIRS |
|---|---|---|---|---|---|
| MR(R1) | ╳ | ╳ | ... | ╳ | ╳ | |
| MR(0) | | | ... | | | 1st ROW OF ELECTRODE PAIRS $E^+(0)$ AND $\overline{E}(0)$ |
| MR(1) | | | ... | | | 2nd ROW OF ELECTRODE PAIRS $E^+(1)$ AND $\overline{E}(1)$ |
| MR(2) | | | ... | | | 3rd ROW OF ELECTRODE PAIRS $E^+(2)$ AND $\overline{E}(2)$ |
| MR(3) | | | ... | | | 4th ROW OF ELECTRODE PAIRS $E^+(3)$ AND $\overline{E}(3)$ |
| MR(4) | | | ... | | | 5th ROW OF ELECTRODE PAIRS $E^+(4)$ AND $\overline{E}(4)$ |
| MR(5) | | | ... | | | 6th ROW OF ELECTRODE PAIRS $E^+(5)$ AND $\overline{E}(5)$ |
| MR(6) | | | ... | | | 7th ROW OF ELECTRODE PAIRS $E^+(6)$ AND $\overline{E}(6)$ |
| MR(7) | | | ... | | | 8th ROW OF ELECTRODE PAIRS $E^+(7)$ AND $\overline{E}(7)$ |
| MR(8) | | | ... | | | 9th ROW OF ELECTRODE PAIRS $E^+(8)$ AND $\overline{E}(8)$ |
| MR(9) | | | ... | | | 10th ROW OF ELECTRODE PAIRS $E^+(9)$ AND $\overline{E}(9)$ |
| MR(10) | | | ... | | | 11th ROW OF ELECTRODE PAIRS $E^+(10)$ AND $\overline{E}(10)$ |
| MR(11) | | | ... | | | 12th ROW OF ELECTRODE PAIRS $E^+(11)$ AND $\overline{E}(11)$ |

FIG. 5

| MEMORY CELL ROW | REDUNDANCY OPERATION MEMORY CELL ROW USED | | | | ADDRESSED ROW OF ELECTRODE PAIRS |
|---|---|---|---|---|---|
| MR(R1) | | | ... | | | 1st ROW OF ELECTRODE PAIRS $E^+(0)$ AND $\overline{E}(0)$ |
| MR(0) | | | ... | | | 2nd ROW OF ELECTRODE PAIRS $E^+(1)$ AND $\overline{E}(1)$ |
| MR(1) | | | ... | | | 3rd ROW OF ELECTRODE PAIRS $E^+(2)$ AND $\overline{E}(2)$ |
| MR(2) | | | ... | | | 4th ROW OF ELECTRODE PAIRS $E^+(3)$ AND $\overline{E}(3)$ |
| MR(3) | | | ... | | | 5th ROW OF ELECTRODE PAIRS $E^+(4)$ AND $\overline{E}(4)$ |
| MR(4) | | | ... | | | 6th ROW OF ELECTRODE PAIRS $E^+(5)$ AND $\overline{E}(5)$ |
| MR(5) | | | ... | | | 7th ROW OF ELECTRODE PAIRS $E^+(6)$ AND $\overline{E}(6)$ |
| MR(6) | | | ... | | | 8th ROW OF ELECTRODE PAIRS $E^+(7)$ AND $\overline{E}(7)$ |
| MR(7) | | | ... | | | 9th ROW OF ELECTRODE PAIRS $E^+(8)$ AND $\overline{E}(8)$ |
| MR(8) | | | ... | | | 10th ROW OF ELECTRODE PAIRS $E^+(9)$ AND $\overline{E}(9)$ |
| MR(9) | ╳ | ╳ | ... | ╳ | ╳ | (10th REGULAR ROW BAD (UNUSED)) |
| MR(10) | | | ... | | | 11th ROW OF ELECTRODE PAIRS $E^+(10)$ AND $\overline{E}(10)$ |
| MR(11) | | | ... | | | 12th ROW OF ELECTRODE PAIRS $E^+(11)$ AND $\overline{E}(11)$ |

SPATIAL LIGHT MODULATOR HAVING REDUNDANT MEMORY CELLS

TECHNICAL FIELD OF THE INVENTION

This invention relates generally to Spatial Light Modulators (SLMs), and more particularly to an SLM with a large array of pixels suited for use in high definition television (HDTV).

BACKGROUND OF THE INVENTION

Spatial Light Modulators (SLMs) have found numerous applications in the areas of optical information processing, projection displays, video and graphics monitors, televisions, and electrostatic printing. SLMs are devices that modulate incident light in a spatial pattern to form a light image corresponding to an electrical or optical input. The incident light may be modulated in its phase, intensity, polarization, or direction. The light modulation may be achieved by a variety of materials exhibiting various electro-optic or magneto-optic effects, and by materials that modulate light by surface deformation.

An SLM is typically comprised of an area or linear array of addressable picture elements (pixels). Source pixel data is first formatted by an associated control circuit, usually external the SLM, and then loaded into the pixel array one frame at a time. This pixel data may be written to the pixel array using a variety of algorithms, i.e. sequentially top-to-bottom one pixel line at a time, interleaving by sequentially addressing top-to-bottom ever other pixel line, such as the odd rows of pixels, and then returning to address the even pixel lines, etc. In cathode ray tubes (CRTs), this data writing technique is known as rasterizing, whereby a high powered electron gun scans across the pixel elements of a phosphor screen left to right, one line at a time. This pixel address data writing scheme is equally applicable to liquid crystal displays (LCDs) as well.

A recent innovation of Texas Instruments Incorporated of Dallas Tex., is the digital micromirror device (DMD). The DMD is an electro/mechanical/optical SLM suitable for use in displays, projectors and hard copy printers. The DMD is a monolithic single-chip integrated circuit SLM, comprised of a high density array of 17 micron square movable micromirrors. These mirrors are fabricated over address circuitry including an array of SRAM cells and address electrodes. Each mirror forms one pixel of the DMD array and is bi-stable, that is to say, stable in one of two positions, wherein a source of light directed upon the mirror array will be reflected in one of two directions. In one stable "on" mirror position, incident light to that mirror will be reflected to a collector lens and focused on a display screen or a photosensitive element of a printer. In the other "off" mirror position, light directed on the mirror will be deflected to a light absorber. Each mirror of the array is individually controlled to either direct incident light into the collector lens, or to the light absorber. The collector lens and a light prism ultimately focus and magnify the modulated light from the pixel mirrors onto a display screen and produce an image in the case of a display. If each pixel mirror of the DMD array is in the "on" position, the displayed image will be an array of bright pixels.

For a more detailed discussion of the DMD device, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the image is achieved by pulse width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of which are incorporated herein by reference.

The DMD is revolutionary in that it is truly a digital display device and an integrated circuit solution. The resolution of the DMD as a SLM is defined by the number of pixel mirrors, and specifically, the number of pixel rows and columns. It is anticipated that by the year 2000, high definition television (HDTV) will be prevalent in broadcasting. The resolution of an HDTV display is currently envisioned to have a pixel array of 1,280×2,048 pixels. This corresponds to over 2,600,000 pixels.

In the case of the DMD as a spatial light modulator, the DMD addressing circuitry includes an array of memory cells fabricated under an array of pixel mirrors. If one memory cell is provided to control each pixel mirror, over 2,600,000 memory cells are required to control an HDTV device. To reduce the number of memory cells required, as set forth in co-pending patent application Ser. No. 08/300,356 filed Sep. 2, 1994 entitled "Pixel Control Circuitry for Spatial Light Modulator", this patent being assigned to the same assignee as the present invention and the teachings incorporated herein by reference, one memory cell can be provided for controlling a plurality of pixel mirrors, i.e. one memory cell for each 16 pixel mirrors. This design reduces the number of memory cells required by a factor of 16, but still requires over 100,000 memory cells to be utilized for an HDTV device. Even with the most modernized semiconductor processes available to manufacture these DMD devices, achieving a high yield DMD device with over 100,000 memory cells is rather difficult.

Conventional memory cell arrays used in SRAM or DRAM devices may have redundant memory cells fabricated adjacent the memory cell array and which redundant cells can be programmed for use during manufacturing to increase yield. These designs are not practical for use in a DMD because portions of the high density address circuitry for a DMD need to be fabricated under the associated pixel mirrors. Therefore, implementing redundant memory cells adjacent the primary memory cell array is not available.

It is desired to provide a spatial light modulator controlled by a large memory cell array that can be reliably manufactured in high yield. Such a SLM device would be suitable for use in many devices including, but not limited to, high resolution displays including those compatible with HDTV having pixel arrays exceeding 1,000×2,000 pixels. The SLM should be functionally testable, and manufacturable in high yield.

SUMMARY OF THE INVENTION

The present invention finds technical advantages as an SLM controlled by a memory cell array having redundant programmable rows of memory cells integrally fabricated into a primary memory cell array. For every predetermined number of primary memory cell rows, there is a redundant (spare) memory cell row that can be easily programmed for use if one primary memory cell row for that associated group is deemed defective and/or inoperable. As exemplified by the disclosure of the preferred embodiment of the present invention, one spare row of memory cells is provided for each group of twelve rows of primary memory cells. The spare row of cells is utilized by blowing two fuses of a fuse network associated with that group of memory cell rows. A memory cell format circuit with redundant logic is responsive to the fuse network, and automatically maps address logic signals to the functional rows of primary memory cells, and the redundant memory cell row, if implemented, both for read and write operations, and bypasses the disabled primary cell row.

The preferred embodiment of the present invention comprises a spatial light modulator having an array of picture elements (pixels), a plurality of memory cells controlling the pixels, and memory cell address logic circuitry generating address signals. A memory cell format circuit is connected between the address logic circuitry and the array of the memory cells, and has mapping logic selectively determining which memory cells are addressed with the address signals to control a particular pixel. The mapping logic of the memory cell format circuit is programmable to ignore a known defective or inoperable primary row of memory cells, and automatically utilize a spare row of memory cells in its place. This memory cell format circuit automatically transfers (maps) read and write address signals from the row address logic to the appropriate rows of memory cells, depending on which pixels are to be controlled. The mapping logic of the programmable memory cell format circuit has built in redundancy logic, and is easily programmed by blowing two of a network of fuses.

In the preferred embodiment, this mapping logic is responsively connected to a plurality of serially connected fuses. The mapping logic senses which one of several fuses is blown, if any, and responsively bypasses an associated row of primary memory cells while now controlling the spare memory cell row associated with that group of memory cells. If no fuses are blown, only the primary rows of memory cells are utilized and the associated spare row of memory cells is not used. When one row of primary memory cells is disabled by blowing the associated fuse, the use of the spare row of memory cells, in effect, causes a "shift" of which memory cell rows are allocated to which pixels. The rows of primary memory cells "above" the defective row now control the groups of pixel mirrors that are below the memory cell row rather than above the particular memory cell row. The row of primary memory cells "below" the defective row continue to control the group of pixel mirrors above the row. The spare row of cells controls the first group of pixel mirrors.

By way of example, for a group of twelve rows of primary memory cells, there is one spare row of memory cells positioned above and adjacent the first row of primary cells. In normal operation, with no fuses blown, all of the 1st through 12th rows of primary memory cells are utilized. However, if any cells of one row of primary memory cells is deemed defective or inoperable, such as the 3rd row of primary memory cells, the spare row of cells functionally becomes the 1st row, the 1st of the primary cell rows becomes the 2nd functional row, the 2nd primary row becomes the 3rd functional row and thus operatively replaces the 3rd (defective) primary cell row, while the remaining 4th through 12th rows of primary memory cells continue to control their associated groups of pixels. In effect, there is an operational "shift" of the primary memory cells "downward" up to the "defective" row of primary memory cells.

If say; for instance, the 12th row of primary memory cells for a particular group is known to be defective or inoperable, there is an operational "shift" of all remaining eleven primary rows, whereby the spare row of memory cells become the 1st row of utilized memory cells, the 1st primary row of cells becomes the 2nd "operable" row of cells, etc., and the 11th primary row of memory cells becomes the 12th "operable" row of memory cells. This automatic reallocation of which memory cell rows are utilized to control the pixels is further understood in view of the following detailed discussion and the appended Figures.

While the present invention preferably includes each memory cell of a row controlling a plurality of pixel mirrors, it is to be understood that one memory cell could be provided for each pixel mirror, and limitation to each memory cell controlling a plurality of pixels is not to be inferred. In addition, the present invention is suited for use with other types of SLM's including LCD arrays, and discussion of a DMD-type SLM is provided for purposes of illustration and clarity.

Several rows of redundant memory cells are interleaved into the large primary array of memory cells, and are thus fabricated under the associated pixel mirrors along with the rest of the primary memory cells. The programmable fused address mapping logic is located adjacent the array of memory cells, and is interposed between the row address logic circuit, which preferably comprises a row decoder circuit, and the array of memory cells. Each fuse preferably comprises a polysilicon fuse fabricated beneath the metal-one layer of the semiconductor device, with an opening being provided through the device structure above each fuse. These fuses of the network are interconnected to the row address circuitry fabricated in other layers, and are blown by simply utilizing a laser to the blow the fuses and create an open circuit between a pair of associated terminals. The mapping logic of the memory cell format circuit senses an open circuit between these two associated terminals, and responsively maps which rows of memory cells are enabled as a function of a row enable address signal from the row decoder circuit, and as a function of a read/write logic line. The fused memory cell format circuit is modular in design, whereby one discrete logic block is provided for each row of primary memory cells. Thus, the present invention is well adapted to automatically control a group of memory cells having any number of memory cell rows, and any configuration of primary memory cells i.e. the ratio of primary memory cell rows to spare memory cell rows. In the preferred embodiment of the present invention and discussed by way of example, one spare memory cell row is provided for each twelve primary memory cell rows.

BRIEF DESCRIPTION OF THE DRAWINGS

FIG. 4 is an illustration of which memory cell row controls which row of electrode etch pairs when the spare row of memory cells is not used and all rows of primary cells are operational;

FIG. 5 is an illustration of which row of memory cells controls which rows of electrode etch pairs when the 10th row of primary memory cells, MR(9), is deemed defective and functionally removed from operation, whereby the spare row of memory cells is implemented as the first operational row of cells;

DETAIL DESCRIPTION OF THE PREFERRED EMBODIMENT

The present invention is suitable with many types of SLMs, including LCD arrays, and the present invention is not to be limited to a DMD-type SLM, which is discussed by way of illustration and clarity in the following detailed discussion.

Figure 1:
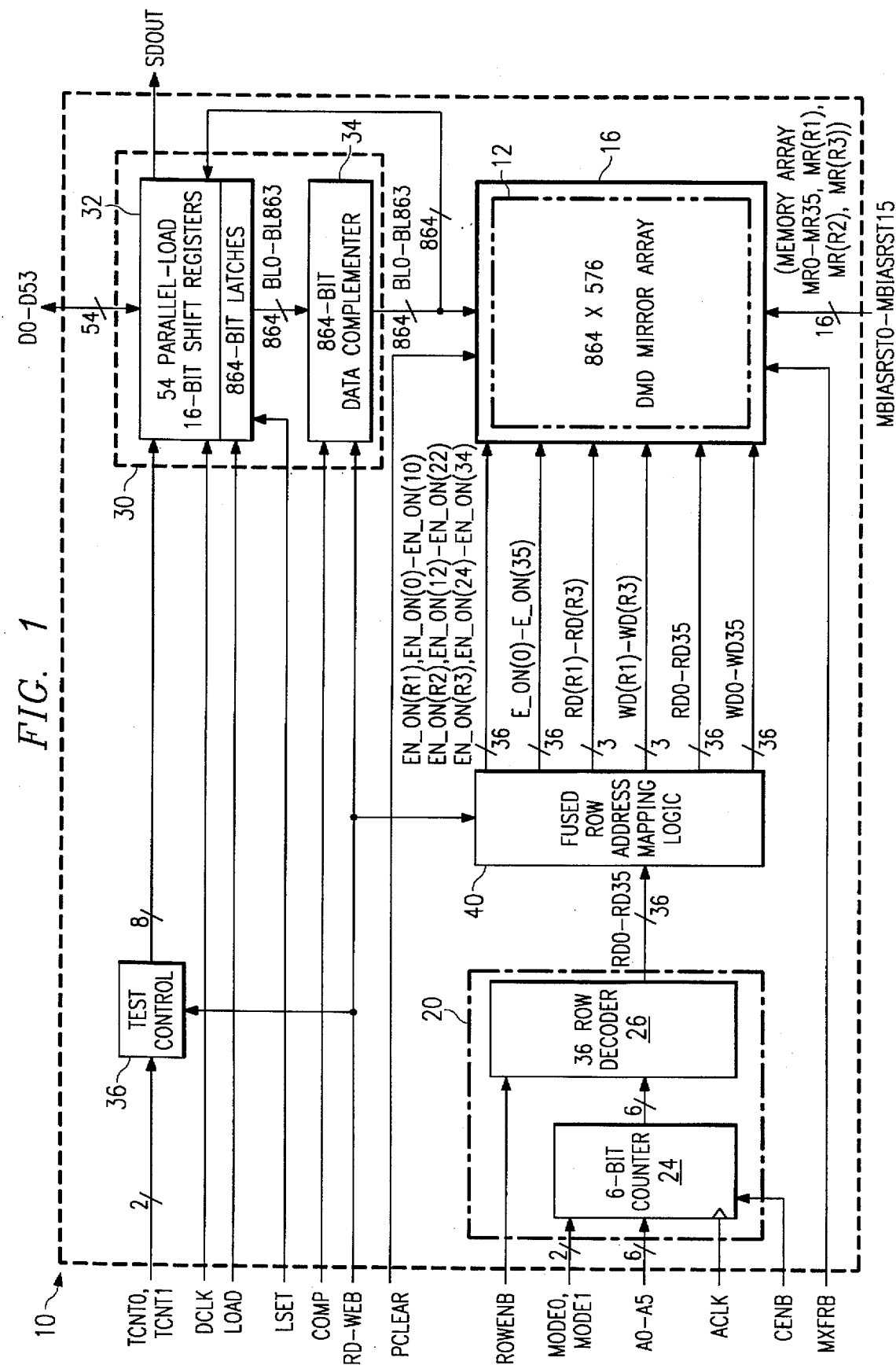
FIG. 1 is a block diagram of a DMD spatial light modulator including a memory cell array having primary rows of memory cells and spare rows of memory cells, the memory array being operationally configured by a fused row address mapping logic circuit.
Figure 2:
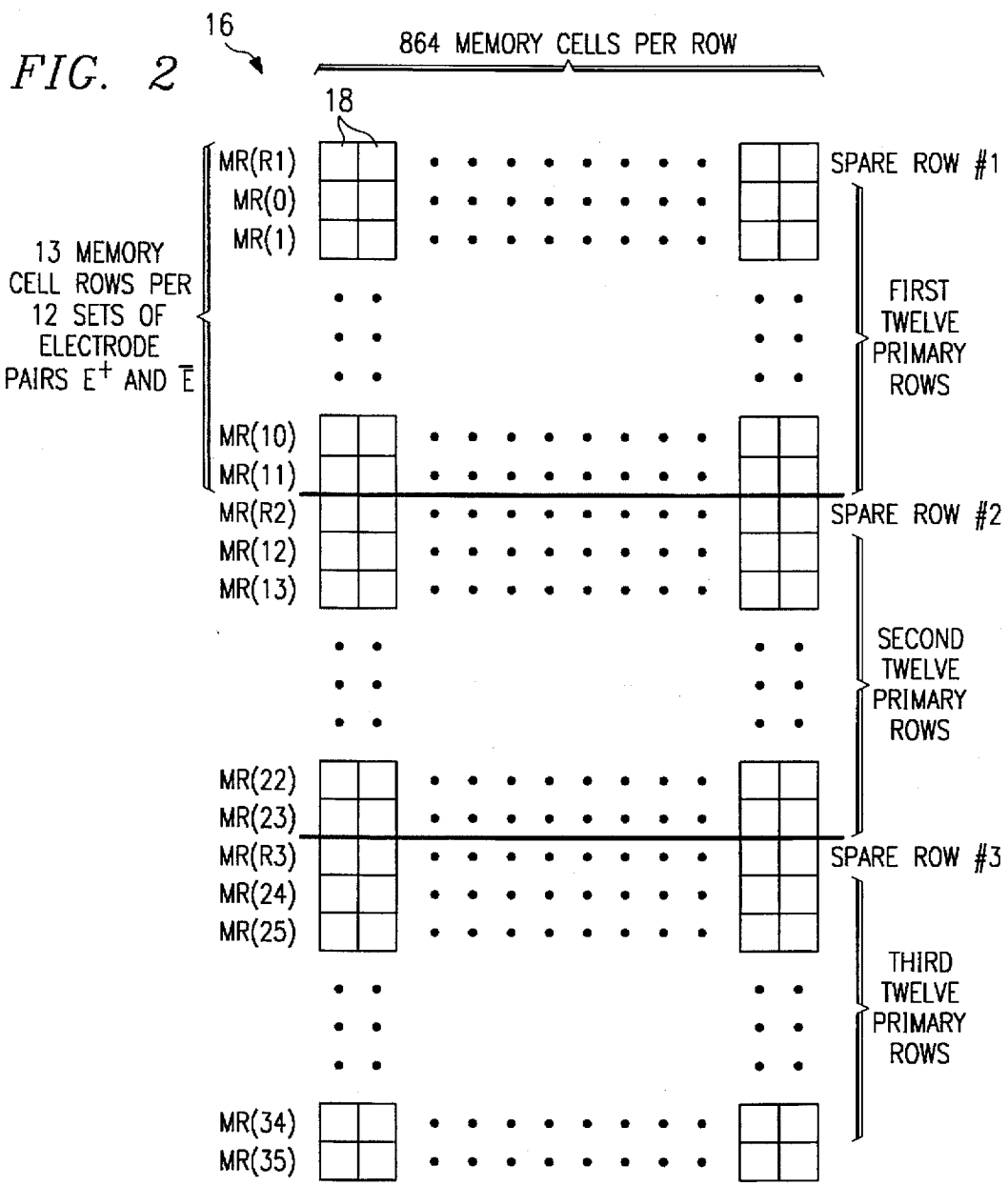
FIG. 2 is a block diagram of the memory cell array of FIG. 1, illustrating a spare row of memory cells for every group of twelve rows of primary memory cells.

Referring to FIG. 1 and FIG. 2, there is shown a DMD spatial light modulator according to the preferred embodiment of the present invention being shown generally at 10. DMD 10 is a monolithic single-chip integrated circuit including an area array 12 of bi-stable pixel mirrors 14 fabricated over an area array 16 of memory cells 18. Peripheral control circuitry, in combination with the underlying array of memory cells 16, controls the deflection of the pixel mirrors 14 to modulate incident light and form a light image. The peripheral control circuitry is seen to include a row address decoder circuit 20 determining which row of pixel mirrors are to be addressed. Circuit 20 is seen to include a 6-bit counter 24 feeding a 36 row decoder circuit 26. Counter 24 is loaded via 6 address lines A0–A5 to establish a start count or to address a particular row of pixel mirrors, and is run asynchronously by a clock pulse provided on the control line ACLK. Row decoder 26 addresses one row of memory cells of array 16 as a function of the count from counter 24.

The peripheral control circuitry is also seen to include a column pixel data load circuit 30. Pixel data load circuit 30 receives externally formatted pixel data on some or all 54 parallel data input lines D0–D53. This pixel data is fed into, but can also be unloaded from, a selectively partitionable shift register circuit 32. During a write operation, this pixel data is loaded into the memory cell array 16 via a data complimenter circuit 34. During a read operation, pixel data is unloaded from the memory cell array 16 into the shift register 32, and shifted out in parallel or in serial format for functional verification of the memory cell array 16. A test control circuit 36 controls whether pixel data is loaded from selected input data lines D0–D53 into the memory cell array, or unloaded from the memory cell array back to selected data lines or output on line SDOUT as a function of several control signals. For additional discussion of the DMD device 10 discussed so far, and the specific row addressing and pixel data loading/unloading algorithms, cross reference is made to co-pending application Ser. No. 08/373,697 filed Jan. 17, 1995, entitled "Monolithic Programmable Format Pixel Array", this co-pending patent application being assigned to the same assignee as the present invention, and the teaching of which is included herein by reference. For additional discussion of the DMD in general, cross reference is made to the cross referenced patents discussed in the section Background of the Invention, the teachings of which are incorporated herein by reference.

Still referring to FIG. 1, DMD 10 is also seen to include a fused row address mapping logic circuit generally shown at 40. As will be discussed shortly, memory cell array 16 includes 36 rows of primary memory cells, MR0–MR35, and also includes 3 rows of spare (redundant) memory cells, MR(R1), MR (R2), and MR (R3). One spare row of memory cells is provided for each block of primary memory cell rows. By way of illustration and shown in the appended Figures, but without limitation thereto, one spare row of memory cells is provided for each group of twelve rows of primary memory cells. If any one cell in one of the primary memory cell rows is deemed to be inoperable or defective, the spare memory cell row for that particular group of 12 primary memory cell rows can be programmed to be used in place of the defective primary memory cell row. This programming is established by blowing associated fuses of a fuse network in the fused row address mapping logic circuit 40, as will be discussed shortly in reference to FIG. 6. If a spare row of memory cells is utilized, the implementation of the spare row of memory cells is transparent to the row decoder circuit 20 and the pixel data load circuit 30. This is because the fused row address mapping logic circuit 40 has redundant circuitry to automatically map a row address signal to the appropriate row of memory cells 18 when a particular row of pixel mirrors 14 are to be addressed.

The spare rows of memory cells are formed integral to the memory cell array 16, and are interleaved into the primary rows of memory cells and under the mirror array 12. The fused row address mapping logic circuit 40, however, is interposed between the row decoder circuit 20 and the memory cell array 16, and adjacent the array of memory cells 16 and pixel mirrors 12. The fused row address mapping logic circuit 40 includes a network of polysilicon fuses buried in an underlying layer of the semiconductor circuit. An opening is provided above each fuse to expose the fuses, with selected fuses being blown by a laser if a spare row of memory cells is needed to be used for proper operation of DMD 10. Each of these fuses are preferably comprised of polysilicon, and are fabricated in the layer of polysilicon under the metal layer of the semiconductor device identified as metal-one. More discussion of this circuit will be provided shortly in regards to FIG. 6.

Turning now to FIG. 2, there is shown an illustration of memory cell array 16, including thirty six (36) rows of primary memory cells, MR(0)–MR(35), as well as three (3) rows of spare memory cells, MR(R1), MR(R2), and MR(R3). As shown, one spare row of memory cells is provided for each block of primary memory cells, and in the preferred embodiment, for every group of 12 rows of primary memory cells. The three rows of spare memory cells are seen to be interleaved in the memory cell array 16. As viewed from top to bottom, the first row of memory cells of each block is a spare memory cell row, whereby the next 12 rows of memory cells are comprised of the primary rows of memory cells. Thereafter, for each block of memory cells, the first row, again, is a row of spare memory cells followed by 12 rows of primary memory cells.

By way of illustration, for DMD 10 with mirror array 12 having dimensions of 864×576 mirrors, with each set of sixteen mirrors 14 in a column being controlled by one memory cell 18, thirty six (36) rows of functional memory cells are needed for proper operation. This technique is known as memory multiplexing, and is also known as split reset, one such control algorithm being disclosed in co-pending patent application Ser. No. 08/300,356 filed Sep. 2, 1994 entitled "Pixel Control Circuitry for Spatial Light Modulator", this patent application being assigned to the same assignee as the present invention, and the teaching included herein by reference.

Of course, the present invention is well suited as a DMD spatial light modulator with other pixel array dimensions, including a mirror array having 1,028×2,048 pixel mirrors for providing a high resolution display compatible with the high definition television (HDTV) standard. Accordingly, while the present invention is set out by way of illustration for a pixel mirror array of 864×576 pixels, limitation to these dimensions is not to be inferred. Moreover, a spare row of memory cells could be provided for each block of fewer or more rows of primary cells, such as for every 8 rows of primary cells, or for every 16 rows of primary memory cells. Thus, limitation to one spare row of memory cells being provided for each block of 12 primary memory cells rows is not to be inferred.

Figure 3A:
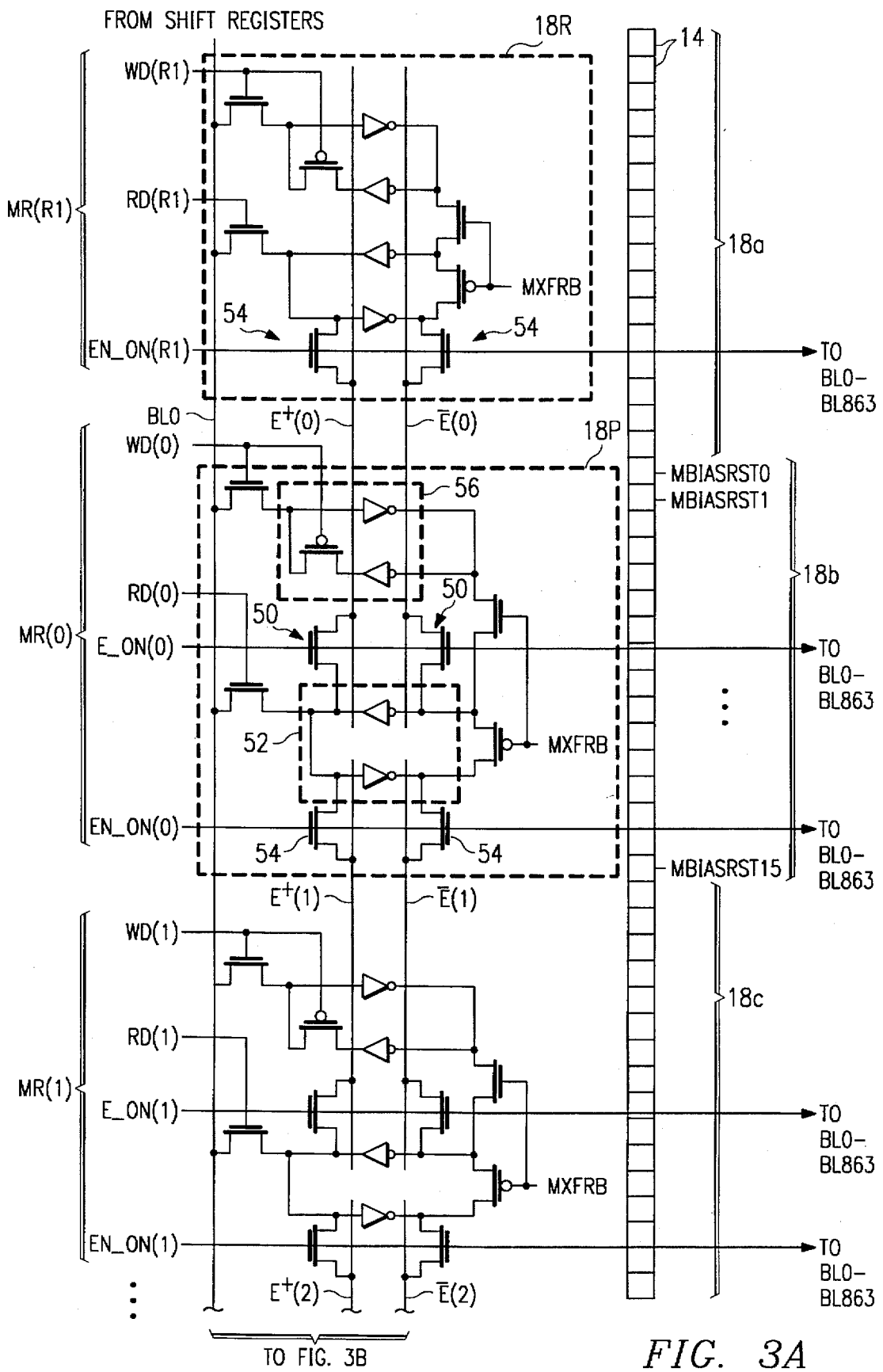
FIG. 3A and FIG. 3B is an electrical schematic of a portion of one block of twelve primary memory cell rows and one spare memory cell row, each primary memory cell capable of being electrically connected to one of two pairs of electrode etches, each memory cell controlling a set of 16 pixel mirrors when implemented.
Figure 3B:
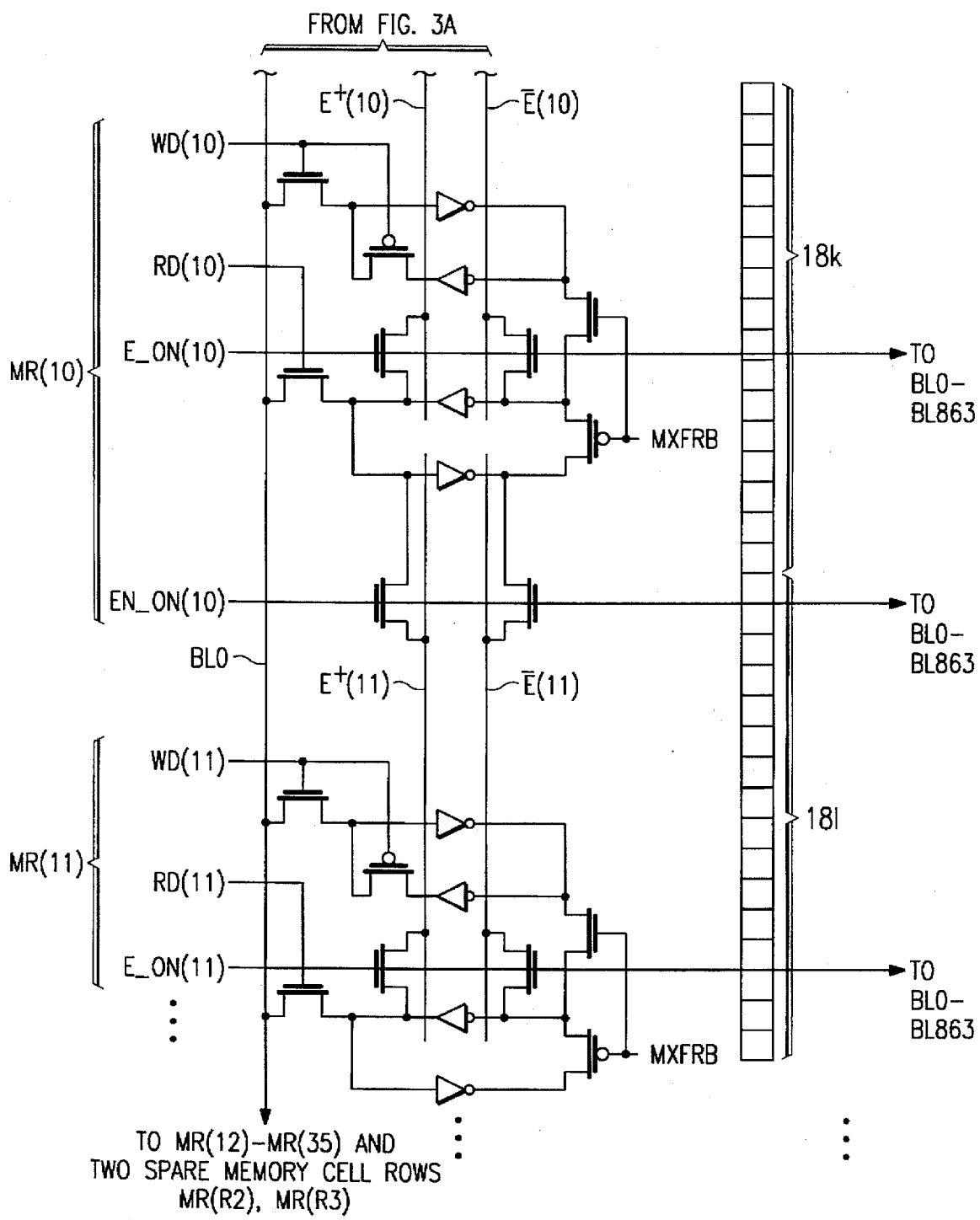

With reference to FIG. 3A and FIG. 3B, a schematic diagram is shown of one spare (redundant) memory cell 18R and twelve primary memory cells 18P for controlling the first twelve groups (18a–18l) of sixteen pixel mirrors 14, for one column of pixel mirrors of array 12, shown as BL0. Every group of sixteen pixel mirrors 14 is fabricated over an associated pair of address electrode etches, E+ and $\overline{E}$. These address electrode etches E+ and $\overline{E}$ are electrically connected to several pairs of address electrodes (not shown), one pair of electrodes being fabricated under each bi-stable pixel mirror 18. An address voltage is provided to one of the two associated electrode etches, E+ or $\overline{E}$, by the operational memory cell 18 connected thereto, as will be discussed shortly, to determine whether the pixel mirror 14 will be electrostatically deflected in one direction or the other when provided with a bias voltage on one of the associated mirror bias reset lines, MBIASRST. The voltage on one electrode etch is always the compliment of the other, i.e. if +5 volts is provided on electrode E+, 0 volts is provided on the other electrode etch, $\overline{E}$. Again, one set of electrode etches control a plurality of pixel mirrors 14, such as a set of sixteen pixel mirrors, this being discussed in considerable detail in the co-pending cross referenced patent application, Ser. No. 08/300,356 entitled "Pixel Control Circuitry for Spatial Light Modulator".

Still referring to FIG. 3A and FIG. 3B, and according to the preferred embodiment of the present invention, each pair of electrode etches E+ and $\overline{E}$ have address voltages provided thereto by either one of two adjacent memory cells 18. Thus, when one primary memory cell row is deemed to have a defective or inoperable cell, the cell of the other memory cell row provides address voltages to the associated set of electrode etches and all pixel mirrors can still be controlled. For instance, referring to the first group of sixteen pixel mirrors 14, identified as group 18a in FIG. 3A, mirror group 18a is fabricated over the pair of electrode etches E+ (0) and $\overline{E}$ (0). Either the memory cell 18R of the spare memory row MR (R1) or the memory cell 18P of the first primary memory cell row, MR(0), can be functionally connected to this first set of electrode etches. Referring to group 18b, either the memory cell of row MR(0) or MR(1) can be functionally controlled to electrodes etches E+ (1) and $\overline{E}$ (1), etc.

Which memory cell provides address voltages to a set of electrode etches is determined by the logic state of the enable lines E__ON and EN__ON associated with each row of memory cells. The logic lines EN__ON and E__ON control the switching state of associated pass transistors, these transistors connecting the address voltage of the second latch 52 of each memory cell 18 to the respective electrode etches. As will be illustrated shortly, if the logic line E__ON is enabled and has a logic "1", i.e. 5 volts, and logic line EN__ON has a logic "0", i.e. ground, the associated row of primary memory cells 18 will provide address voltages to the sets of electrode etches "above" the cell row. If, however, the logic line EN__ON is a logic "1", i.e. 5 volts, the other associated logic line E__ON is a logic "0", i.e. ground. In this case, the associated row of memory cells control the sets of electrode etches "below" this cell row. When the spare memory cell row MR (R1) is implemented, EN__ON (R1) is a logic "1".

For instance, logic line E__ON (0) associated with cell 18P of the first primary cell row is connected to the gates of a pair of pass transistors 50. These pass transistors 50 connect the output of a second latch 52 of memory cell 18P to the "upper" pair of address electrode etches E+ (0) and $\overline{E}$ (0). Logic line EN__ON (0), however, is connected to the gate terminals of a pair of pass transistors 54. Each of pass transistors 54, when enabled, connect the address voltage from the second latch 52 to the respective pair of address electrode etches therebelow when enabled, i.e. E+ (1) and $\overline{E}$ (1). Only one logic line E__ON or EN__ON of a particular pair is enabled at any one time, with one logic line of a pair always being enabled and one logic line always being disabled. The logic signals provided to all of these control lines E__ON and EN__ON are generated by the fused row address mapping logic circuit 40 of FIG. 1, and which will be discussed in considerably detail shortly in regards to FIG. 6A and FIG. 6B.

Also seen to be associated with each row of memory cells 18 is a pair of read/write logic lines, WD and RD. The read/write lines WD and RD determine whether pixel data is loaded (written) from the respective bit lines BL0–BL863 into a first latch 56 of the respective primary or spare memory cells or unloaded (read) from the second latch 52 of the primary or spare memory cells back to the respective bit lines. The logic transfer line MXFRB is enabled to latch pixel data from the first latch 56 to the second latch 52.

During normal operation, with the spare row of memory cells MR (R1) not being used, the memory cells 18 of primary cell row MR (0) control the first group of mirrors 18a associated with each bit line BL0–BL863. If, however, the memory cells 18R from the spare row of memory cells MR (R1) are implemented, each row of the primary memory cells is "functionally" shifted down to provide address voltages to the lower set of electrode etches and control the next lower set of mirrors, this shifting occurring up to the defective row of memory cells which are functionally removed from operation. For instance, if the memory cells of primary memory row MR (1) are functionally removed from operation, as will be described shortly, the spare memory cells of row MR (R1) control the first group of pixels 18a associated with each bit line, the next memory cell row MR (0) controls the pixel mirrors of the next group 18b, the memory cells of primary row MR (1) are not used, and the remaining memory cells of primary rows MR (2)–MR (11) control the remaining sets of pixel mirrors 18c–18l as before. Thus, the "functional shifting" of the primary memory cell rows downward to control the next set of pixel mirrors for each bit line is established only up to the disabled primary memory cell row.

Referring to FIGS. 4 and 5, this "shifting" of memory cell rows downward to control the next (lower) row of electrode pairs and groups of pixel mirrors is illustrated. As shown in FIG. 4, if the spare row of memory cells MR (R1) is not used, the first row of primary memory cells MR (0) control the row of electrode pairs E+ (0) and $\overline{E}$ (0) of all bit lines BL0–BL863, the second row of primary cells of MR (1) control the row of electrode pairs E+ (1) and $\overline{E}$ (1), and so forth. As shown, the 12th row of primary memory cells for this block, MR (11), controls the 12th row of electrode etch pairs E+ (11) and $\overline{E}$ (11) for each of the 864 bit lines.

Referring to FIG. 5, if one cell of a primary memory cell row is determined to be functionally inoperable or defective, rendering that entire row of cells inoperable, and illustrated as the 10th row of primary memory cells MR (9), the associated spare row of memory cells for that block of twelve primary memory cell rows, in this case, MR (R1), is utilized. Here, the memory cells in the spare row MR (R1) control the first row of electrode pairs E+ (0) and $\overline{E}$ (0) for all 864 electrode etch pairs associated with bit lines BL0–BL863. The next row of operable memory cells, which is the first row of primary memory cells, MR (0), is now connected to and controls the second row of electrode pairs, E+ (1) and $\overline{E}$ (1). The third row of operable memory cells to be used, which is the second row of primary memory cells, MR (1), controls the third row of electrode pairs, E+ (2) and $\overline{E}$ (2). This successive functional "shifting" downward of the primary memory cell rows, with each cell actually now controlling the electrode etch pair below the memory cell rather than above the memory cell, as shown in FIG. 5, continues up to the point of the defective row of memory cells, the 10th row of primary memory cells, MR (9). Thereafter, the "regular" association of primary memory cell rows to rows of electrode etch pairs resumes, with the 11th row of primary memory cells MR (10) being connected to and controlling the 11th row of electrode pairs E+ (10) and $\overline{E}$ (10).

Referring back to FIG. 3A and FIG. 3B, the selective implementation of the spare row of memory cells causes a rather straight forward implementation of the remaining operational primary rows of memory cells. With a defective row of memory cells functionally removed from operation, the remaining rows of operational memory cells of that block will continue to control all of the associated groups of pixel mirrors 18a–18l, without any disruption to the normal row address sequence. In other words, whether or not a spare row of memory cells is implemented, the mapping of a row address signal to an operational row of cells is "transparent" to the row address logic 20. Likewise, the implementation of a spare row of memory cells is also transparent to the column data load circuit 30.

As is required in the case of a DMD spatial light modulator, all the memory cells 18 which are implemented remain under the array 12 of pixel mirrors 14. No additional control circuitry i.e. address electrodes, address electrode buses, etc are required. Rather, only additional rows of memory cells 18 are provided, with logic enable lines E__ON (0)–E__ON (35), EN__ON (0)–EN__ON (10), EN-ON (12)–EN-ON (22), EN__ON (24)–EN__ON (34), as well as logic lines EN__ON (R1), EN__ON (R2), and EN__ON (R3), being driven by the fused row address mapping logic circuit 40. Thus, the implementation of the interleaved spare memory cells, both in fabrication, layout, and the necessary control thereof, is neatly obtained. The sets of pixel mirrors 18a–18l are still controlled by the same set of electrode etches E+ and $\overline{E}$ extending thereunder, these electrode etches E+ and $\overline{E}$ each receiving address voltages from one of two memory cells as discussed. Since each memory cell is proximate to two pairs of electrode etches E+ and $\overline{E}$, the additional pass transistors 50 and 54 which are enabled by logic lines E__ON and EN__ON, respectively, permit easy configuration of memory cells to pairs of electrode etches E+ and $\overline{E}$.

Figure 7:
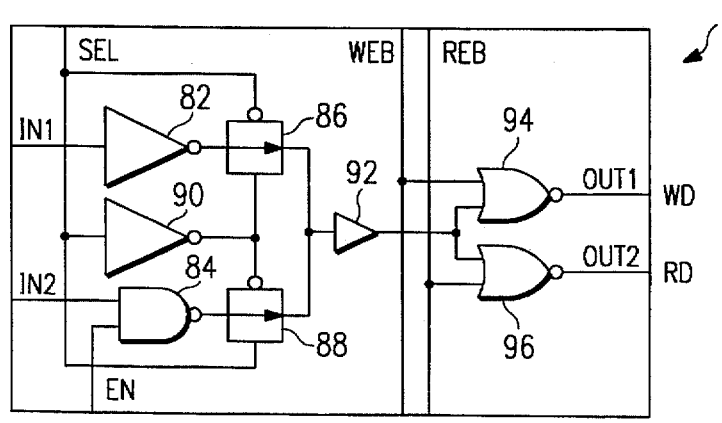
FIG. 7 is an electrical schematic of one of the logic circuit blocks of the mapping circuit shown in FIG. 6A and FIG. 6B.
Figure 6A:
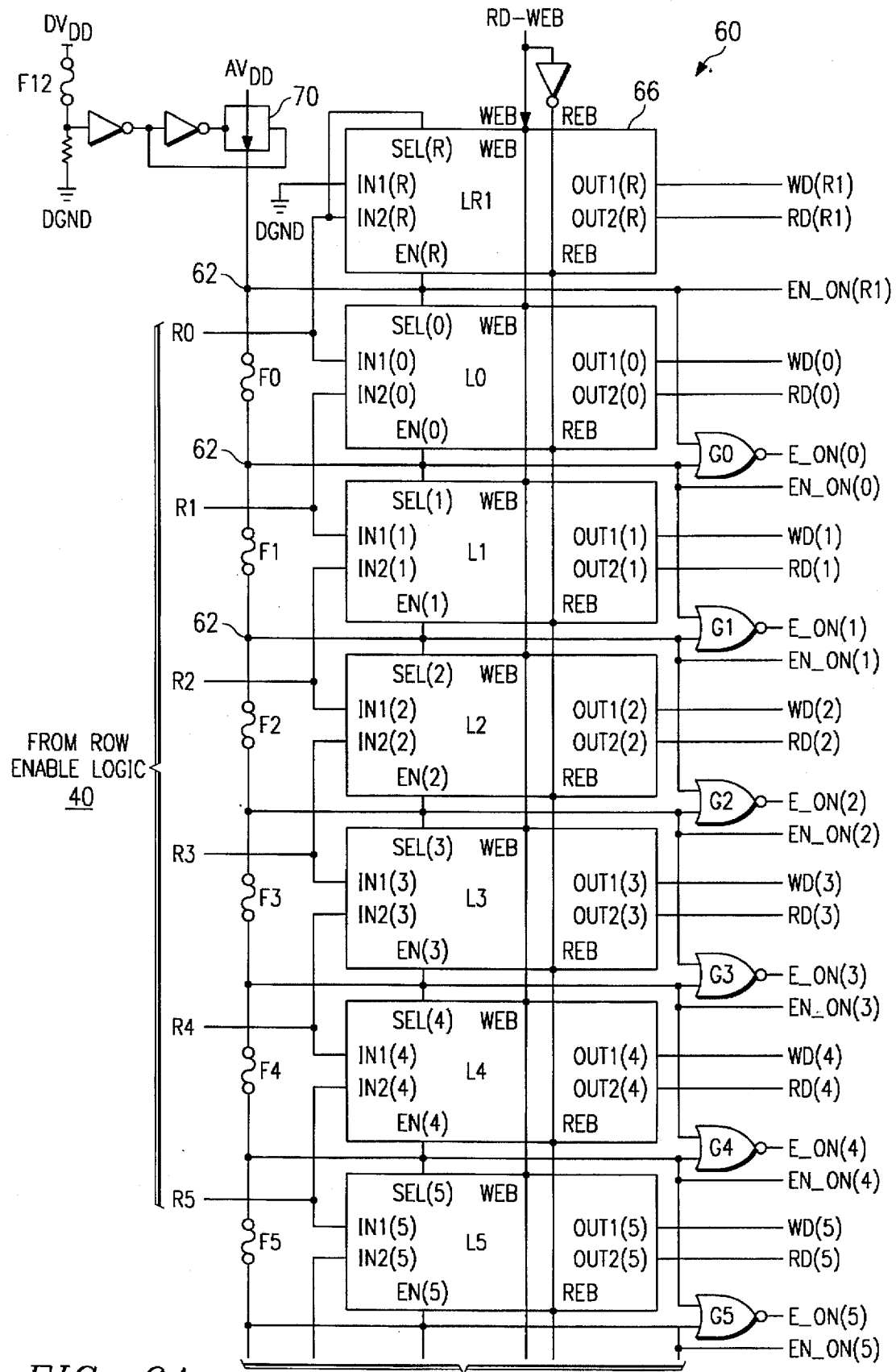
FIG. 6A and FIG. 6B is an electrical schematic diagram of one portion of the fused row address mapping logic circuit of FIG. 1, with the portion of the circuit being shown controlling the first group of twelve primary memory cell rows and one spare row of memory cells, as a function of the fuse network, and as a function of the read/write control line.
Figure 6B:
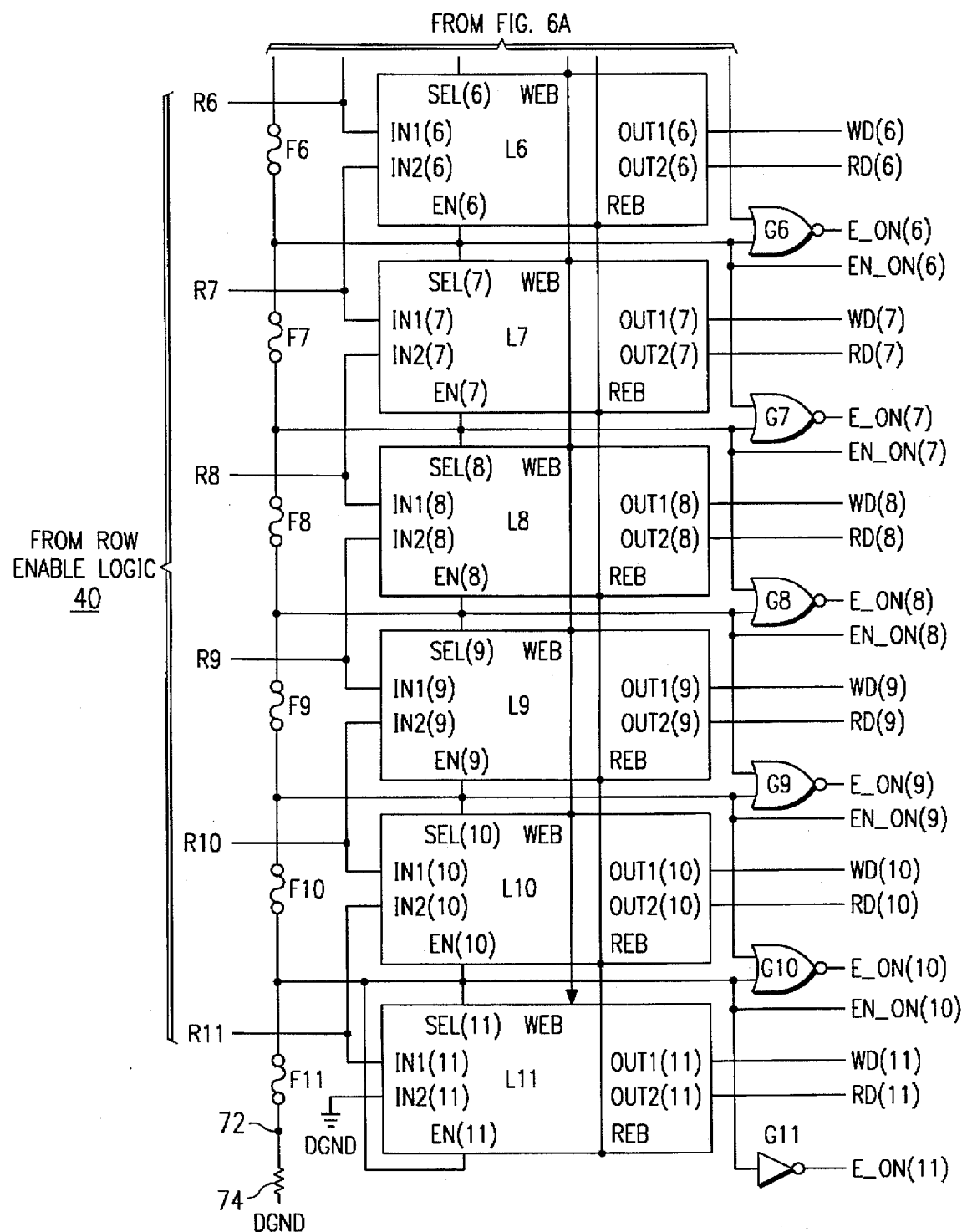

Turning now to FIG. 6A, FIG. 6B and FIG. 7, the programmable fused row enable mapping logic circuit 40 of FIG. 1 is shown. For purposes of illustration and clarity, one of three identical portions 60 of circuit 40 are shown. Each circuit 60 controls which primary rows of the associated group of cell rows are implemented, and if the spare row of memory cells is implemented. Circuit 60 also maps row enable signals from decoder 26 to the implemented memory cell rows. The circuit 60 shown controls the implementation of the first 12 rows of primary memory cells, MR0–MR11, and the first spare row of memory cells, MR (R1). For the other two blocks of memory cell rows, i.e. MR12–MR23 and MR (R2), and MR24–MR35 and MR (R3), an identical control circuit 60 is provided for each respective block.

Referring now to FIG. 6A and FIG. 6B, circuit 60 is seen to include a network of 12 serially connected fuses identified as F0–F11, and a fuse F12. These fuses are positioned adjacent the memory cell array 16, and an opening is provided above each fuse so that it can be blown if necessary. Between each set of two serially connected fuses is a node 62, the voltages at these nodes 62 being sensed by a respective logic circuit 66. Each logic circuit 66, in effect, determines the potential at inputs IN1, IN2, SEL and EN, determines whether or not there is a voltage difference between the two associated nodes 62, these nodes being connected to the two inputs SEL and EN of that circuit 66, and maps a row enable signal accordingly. Each circuit 66 generates a write or read signal on outputs OUT1 and OUT2, respectively, as a function of the read/write enable lines WEB and REB in one of two scenarios, as will be described shortly, depending on whether the spare row of cells MR1 are used. These read/write signals on RD and WD, in turn, control the associated row of memory cells 18, as shown in FIG. 3A and FIG. 3B.

The top end of the fuse network proximate fuse F0 is connected to a switch 70, this switch connecting a digital voltage potential $AV_{DD}$ to fuse F0 only when switch 70 is enabled. Switch 70 is only enabled when fuse F12 is blown, this fuse being blown when the redundant row of cells MR1 is to be used. Otherwise, switch 70, which preferably comprises a series of MOS transistors, is seen by fuse F0 as a high impedance connection to potential $AV_{DD}$. At the other end of the fuse network, proximate fuse F11 and identified as node 72, there is connected a high impedance resistor 74 to ground potential.

When none of the fuses F0–F11 are blown, this ground potential is provided to all nodes 62 of the network. Thus, each of the logic circuits 66, identified as LR1, L0–L11, detect a ground potential and no voltage difference across the respective two inputs, identified as SEL and EN. Consequently, each of these logic circuits 66 will provide a logic "1" to the respective read or write line, RD or WD, as a function of the read/write lines REB and WEB, respectively, but only when a logic "1" is provided by row decoder 26 to the respective input line IN 1. If, however, the spare row of memory cells MR (R1) are to be implemented, the generation of a read/write enable to read line RD or write line WD by each logic circuit 66 may be reconfigured. This depends on whether or not the fuse associated with the particular logic circuit 66 is blown, or if a fuse above the circuit is blown, and if a logic "1" is provided to input IN1 or input IN2. This scenario is further understood by example and will now be discussed.

In the case when all twelve rows of primary memory cells MR0–MR11 are deemed operational and are to implemented, the spare row of memory cells MR (R1) is not used, and no fuses are blown. With each of the fuses F0–F11 intact, a ground is provided by resistor 74 to each of the enable lines EN and the select lines SEL of all logic circuits 66 identified as LR1 and L0–L11. Thus, the respective logic circuit 66 will provide a read/write enable OUT2 or OUT1 as a function of the read and write lines WEB and REB when a logic "1" is provided on input line IN1. The input line IN1 of logic circuits L0–L11 are connected to one of the select lines R0–R11 from row decoder 26 of decoder circuit 20 as shown in FIG. 1. The logic circuit 66 associated with the spare row of cells, and identified as LR1, has ground connected to IN1(R) and never generates a read/write pulse on either of read line RD (R1) or write line WD (R1) in this mode.

If, for instance, a first row of operational memory cells is to be addressed by decoder 26, in this case MR (0) since the redundant spare row of memory cells MR1 is not being used, row decoder 26 provides a logic "1" to line R0 and thus to input line IN1 (0) of logic circuit L0. In turn, logic circuit L0 provides a read or write enable on RD (0) or WD (0) as a function of the read/write lines REB and WEB. If a logic "0" is provided to write line WEB, a logic "1" will be provided on output line OUT1. If a logic "0" is provided on read line REB, a logic "1" is provided on output line OUT2. The logic map of logic circuits 66 will be discussed shortly in regards to FIG. 7 and Table 3. Likewise, if any other row MR2–MR11 of operational rows of cells are to be addressed by decoder 26, a row enable on lines R1–R11 will be mapped to WD (1)/RD (1)–WE (11)/RD (11), respectively.

Now, in the case when the spare row of memory cells MR (R1) is to be implemented, one of fuses F0–F11 is blown, namely, the fuse associated with a known defective row of primary memory cells, and then fuse F12 is blown. (Fuse F0 is associated with MR0, F1 with MR1, etc.) This causes the logic circuits 66 to provide a read or write enable as a function of whether a logic "1" is provided to respective input line IN1 or input line IN2, and as a function of whether a logic 1 is provided to the respective select input SEL.

Referring back to FIG. 5, in the case when the 10th row of primary memory cells, MR(9), is removed from operation, fuse F9 is blown first, and then fuse F12 is blown. This causes a ground potential (Logic "0") to be provided to input line EN (9) of logic circuit L9, and a potential $AV_{DD}$ (logic "1") to be provided to select line SEL (9). Lines SEL (0)–SEL (8) and EN (0)–EN (8) all have a logic "1" as well, with a logic "0" provided to SEL (10), EN (10), SEL (11), and EN (11). Here, logic circuit L9 will never provide a read or write enable to RD (9) or write line WD (9). For the ten logic circuits thereabove, namely LR1 and L0–L8, the respective logic circuit will provide a read or write enable to the respective RD or WD line when a logic "1" is provided by row decoder 26 to the respective input line IN2. For instance, if the 10th row of operational memory cells is to be written to, a logic "1" is provided to the 10th row enable line, RP, by row decoder 26. This logic "1" is provided to input line IN2 (8). Consequentially, logic circuit L8 will provide a read or write enable on read line RD (8) or write line WD (8) as a function of the read/write lines REB and WEB. All the remaining logic circuits LR1, L0–L7, above L8 will provide a read or write enable to the respective read line RD and write line WD when a logic "1" is provided to the respective input IN2. The logic circuits L10 and L11 therebelow will provide a read or write enable on the respective line RD and WD when a logic "1" is provided to the respective input line IN1. Again, the logic signals provided to inputs IN1 and IN2 of one logic gate 66 are provided by the respective row enable line $R_n$ from row decoder circuit 20.

In summary, the logic circuit 66 "above" a blown fuse provides a read/write enable on a respective read line RD or write line WD as a function of a logic "1" being provided to input IN2. The logic circuit 66 "below" a blown fuse, and all logic circuits 66 when no fuses are blown, provide a read/write enable to the read line RD or write line WD as a function of the logic "1" being provided to input line IN1. A logic circuit 66 associated with a blown fuse has a logic "0" provided to the enable line EN, and a logic "1" provided to the select line SEL, and thus never provides a write or read enable to the respective read line RD and write line WD, as shown later in Table 3.

Now, to understand which rows of memory cells of memory array 16 are utilized, which is dependent upon whether a logic "1" is provided to the respective logic line E_ON or EN_ON, reference is made to FIG. 6A and FIG. 6B and Table 1 below.

TABLE 1

NORMAL OPERATION
NO FUSES BLOWN

| ROW ENABLE SELECTED | E_ON | EN_ON | MEMORY ROW SELECTED |
| --- | --- | --- | --- |
|  |  | L | MR(R1)UNUSED |
| R0 | H | L | MR(0) |
| R1 | H | L | MR(1) |
| R2 | H | L | MR(2) |
| R3 | H | L | MR(3) |
| R4 | H | L | MR(4) |
| R5 | H | L | MR(5) |
| R6 | H | L | MR(6) |
| R7 | H | L | MR(7) |
| R8 | H | L | MR(8) |
| R9 | H | L | MR(9) |
| R10 | H | L | MR(10) |
| R11 | H |  | MR(11) |

In the case when the spare row of memory cells MR (R1) is not to be utilized, none of the fuses F0–F11 or F12 are blown. Thus, each of the NOR logic gates G0–G10 and inverter gate G11 have a ground potential, logic "0", provided to one of each of their inputs by resistor 74 via the fuse network. Likewise, control line EN_ON (R1) and all lines EN_ON (0) through EN_ON (10) also are logic "0". With a logic "0" being provided to the other input of each of these gates G0–G10, a logic "1" is provided to the output of each respective gate, and thus to the logic line E_ON associated with each gate. Referring back to FIG. 3A and FIG. 3B, with the logic lines EN_ON (R1), EN_ON (0)–EN_ON (10) all having a logic "0", and all logic lines E_ON (0) E_ON (11) having a logic "1", each memory cell 18 therefore provides data to the pair of electrode etches E+ and $\overline{E}$ "above" the associated memory cell. With, a logic "0" provided to logic line EN_ON (R1) associated with the spare row of memory cells, MR (R1), the respective pass transistors 54 are disabled and do not provide data from the spare memory cells to the first set of electrode etches E+ (0) and $\overline{E}$ (0).

Referring now to Table 2 below, which illustrates the case when the 10th row of primary memory cells, MR9, is disabled and the spare row of memory cells MR (R1) is implemented, the logic signals to the various control lines E_ON and EN_ON are reconfigured.

TABLE 2

REDUNDANCY OPERATION
F12 AND F9 BLOWN

| ROW ENABLE SELECTED | R_ON | EN_ON | MEMORY ROW SELECTED |
|---|---|---|---|
| R0 |   | H | MR(R1) |
| R1 | L | H | MR(0) |
| R2 | L | H | MR(1) |
| R3 | L | H | MR(2) |
| R4 | L | H | MR(3) |
| R5 | L | H | MR(4) |
| R6 | L | H | MR(5) |
| R7 | L | H | MR(6) |
| R8 | L | H | MR(7) |
| R9 | L | H | MR(8) |
| R10 | H | L | MR(10) |
| R11 | H |   | MR(11) |

*MR (9) DISABLED

To disable the 10th row of primary memory cells, MR9, fuse F9 is first blown, and then fuse F12 is blown to provide a logic "1" to the inputs SEL and EN of each logic circuit LR1 and L0–L8 "above" the logic circuit L9 associated with the disabled row of memory cells, MR9. Fuse F12 is always blown last to avoid sinking current through the fuse network to ground via switch 74. Specifically, it can be seen that switch 70 will provide a logic "1" to all of the logic lines EN_ON (R1), and EN_ON (0)–EN_ON (8) above the blown fuse F9, with the associated logic gates G0–G9 providing a logic "0" to logic lines E_ON (0)–E_ON (9). Because of the blown fuse F9, however, a logic "0" is provided to one input of gate G9, to both inputs of gate G10, and to gate G11. Thus, gates G10–G11 still provide a logic "1" to lines E_ON (10)–E_ON (11), with a logic "0" still being provided to lines EN_ON (9)–EN_ON (10).

Referring back to FIG. 3A and FIG. 3B, it can be seen that with EN_ON (R1) and EN_ON (0)–EN_ON (8) having a logic "1", the associated rows of memory cells will provide address voltages via the enabled pass transistors 54 to the pair of respective electrode etches E+ and E̅ "therebelow". For instance, the memory cells 18R of the spare row of cells MR1 will provide address voltages via transistors 54 to electrode pairs E+ (0) and o̅E̅ (0), with the memory cells 18P of the first primary row of cells, MR (0), providing address voltages via enabled pass transistors 54 to the second set of electrode etches E+ (1) and E̅ (1), and so forth. Again, the 10th row of primary memory cells, MR (9), is disabled since a logic "0" is provided to both logic lines E_ON (9) and EN_ON (9). The row of primary memory cells below the disabled row, MR (10) and MR (11), remain operational as before since E_ON (10) and E_ON (11) are a logic "1". The memory cells of primary row MR (10) provide address voltages to etches E+ (10) and E̅ (10), and primary memory cell row MR (11) provide address voltages to electrode pairs E+ (11) and E̅ (11).

Thus, it can be seen that by blowing one of the twelve fuses F0–F11, the logic lines EN_ON "above" the blown fuse will be provided with a logic "1" and the associated lines E_ON will be provided with a logic "0". The lines E_ON and EN_ON associated with the blown fuse will both be provided with a logic "0", which disables the respective row of primary memory cells. The logic lines E_ON below the blown fuse are continued to be provided with a logic "1", with the associated lines EN_ON provided with a logic "0". Again, the logic levels provided on the respective lines E_ON and EN_ON are summarized in Table 1 and Table 2 by way of example, and are shown to change when one associated fuse "below" the lines is blown.

Referring now to FIG. 7, the electrical schematic of one logic circuit 66 is shown, with the output signals provided on WD and RD by this circuit as a function of the input signals being summarized in Table 3 below.

TABLE 3

| INPUTS | | | | | | OUTPUTS | |
|---|---|---|---|---|---|---|---|
| IN1 | IN2 | SEL | EN | WEB | REB | OUT1 | OUT2 |
| 0 | 0 | 0 | 0 | X | X | 0 | 0 |
| 1 | 0 | 0 | 0 | 0 | 1 | 1 | 0 |
| 1 | 0 | 0 | 0 | 1 | 0 | 0 | 1 |
| 0 | 1 | 0 | 0 | X | X | 0 | 0 |
| 0 | 1 | 1 | 1 | 0 | 1 | 1 | 0 |
| 0 | 1 | 1 | 1 | 1 | 0 | 0 | 1 |
| 0 | 1 | 1 | 0 | X | X | 0 | 0 |

As illustrated, logic circuit 66 provides a logic "1" to output lines OUT1 and OUT2 as a function of the input lines WEB and REB, in one of two scenarios. First, when input line IN1 is provided with a logic "1" and both the select line SEL and the enable line EN have a logic "0". Secondly, when input line IN2 is provided with a logic "1" and the select line SEL and the enable line EN are both provided with a logic "1", which corresponds to the row of spare memory cells MR1 being implemented. No output is provided of a logic "1" is provided on line SEL and a logic "0" is provided on line EN, corresponding to a disabled primary row of cells.

Referring to FIG. 7, input line IN1 is seen to be connected to an inverter 82 and input line IN2 being connected to one input of a NAND gate 84. The output of inverter 82 is connected to a pass gate 86, and the output of NAND gate 84 being connected to a pass gate 88. The enable line EN is connected to the other input of NAND gate 84. The input line SEL is connected directly to one control input of each pass gate 86 and 88, and is also connected to an inverter 90, the output of inverter 90 being connected to a second control input of each pass gate 86 and 88. When a logic "1" is provided to the control line SEL, pass gate 88 is enabled, and pass gate 86 is disabled. When a logic "0" is provided to the SEL line, pass gate 86 is enabled and pass gate 88 is disabled. The outputs of each pass gate 86 and 88 are connected to the input of a buffer 92. The output of buffer 92 is connected to one input of each of NOR gates 94 and 96. The other input of each gate 94 and 96 is connected to one of either input line WEB or REB, as shown.

For gates 94 or 96 to provide a logic "1" to respective output lines OUT1 and OUT2, corresponding to a write enable on line WD or a read enable on line RD, buffer 92 needs to provide a logic "0" to one input of each of gates 94 and 96, and the other input line REB or WEB needs to be a logic "0". Otherwise, each of gates 94 and 96 will provide a logic "0" to output lines OUT1 and OUT2.

To provide a logic "0" to gates 94 and 96, a logic "0" needs to be provided to buffer 92. This can happen one of two ways. First, by providing a logic "1" to input IN1 while providing a logic "0" to input select line SEL. Second, by providing a logic "1" to input IN2 while providing a logic "1" to both the select line SEL and the enable line EN. In the first case, either the spare row of memory cells MR1 is not being used, or, the primary row of memory cells that is disabled resides "above" the particular logic circuit 66. In the second case, when a logic "1" is provided to input lines SEL and EN, one of the fuses F0–F11 "below" the particular logic circuit 66 is blown. Thus, one of two logic inputs from the row decoder circuit 26 of FIG. 1 can generate a read or write enable signal, which depends on whether or not the spare row of memory cells MR (R1) is being utilized.

In summary, the spatial light modulator has an array 16 of memory cells 18, each cell for controlling one or a set of pixels 14. The memory cell array is also provided with several rows of interleaved spare memory cells, MR1–MR3, one being provided for each group of primary memory cell rows. If one primary memory cell row of that group is deemed to be defective, the spare row of memory cells can be electrically implemented in that group in its place to provide a functioning memory cell array for controlling all the pixel mirrors. Each memory cell of the primary rows of cells can provide pixel address voltages to either the set of electrode pairs above or below the memory cell, to in turn control the set of pixel mirrors 18a–18l above or below the memory cell. This permits the spare row of memory cells to be implemented, with the primary row of memory cells between the spare row of cells and the disabled row of cells being "shined" down to control the set of electrode etches E+ and Ē therebelow. This creates a "ripple effect" whereby the primary memory cell rows are shifted down one notch, with the last shifted row of cells taking the place, in effect, of the disabled row of primary cells. This ripple down effect is shown by way of illustration in FIG. 5.

The fused row address mapping logic circuit and the spare row of memory cells are essentially transparent to the row address decoder circuit 20 and the column data load circuit 30. As described by way of illustration in this application, which of the 36 primary rows of memory cells and spare rows of memory cells MR1–MR3 that are utilized to control the mirror array 12 are determined by blowing a few fuses, if any. In the present example, up to three rows of spare memory cells can be utilized, requiring two fuses to be blown for each utilized spare memory cell row. If all three rows of spare memory cells are to be utilized, a total of six fuses are blown. Blowing these fuses is rather simple as they are exposed through openings (not shown) in the integrated circuit fabricated above the polysilicon fuses and adjacent the mirror array 12. The polysilicon fuses essentially disintegrate when blown and do not leave any residue behind.

The fused row address mapping logic circuit 40 essentially has built in logic redundancy to provide (map) a read/write enable signal to the appropriate row of memory cells, as a function of the row enable signal provided by the row decoder circuit 20, and as a function of the fuse network configuration. If the spare row of memory cells MR1 is implemented, the read line RD (R1) and write line WD (R1) are utilized to address the first operational row of memory cells for that block, MR1. The next pair of read/write lines, RD (0) and WD (0) control the next row of operational memory cells, MR0, and so forth. For the thirty six (36) row decoder input lines R0–R35, there are a total of thirty nine (39) pairs of read/write lines RD and WD, of which only 36 pairs are used at any one time. These pairs of read/write lines RD and WD are associated with a particular row of memory cells, which may or may not be implemented in the functioning memory array. Thus, if say, for instance, the 10th row of primary memory cells MR(9) is not utilized, the associated read/write lines RD (9) and WD (9) are not utilized as well. This row of memory cells and associated read/write lines are automatically disabled by the fused row address mapping logic circuit 40, as discussed in reference to FIGS. 6A, FIG. 6B, and FIG. 7.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A spatial light modulator, comprising:
   a) an array of picture elements;
   b) a plurality of memory cells arranged in rows controlling said picture elements;
   c) memory cell addressing means for generating row address signals; and
   d) a mapping circuit coupled between said addressing means and said memory cell rows for selectively determining which subset of said memory cell rows are addressed by said row address signals to control said picture elements, said mapping circuit having a separate logic cell associated with each said memory cell row, each said logic cell having two inputs receiving two of said row address signals and an output driving said associated memory cell row.

2. The spatial light modulator as specified in claim 1 wherein said logic cells conduct zero current between either of two said inputs and said output.

3. The spatial light modulator as specified in claim 1 wherein said mapping circuit further comprises a fused circuit programming said mapping circuit, said logic cells addressing said associated row of memory cells as a function of said fused circuit and one said row address signal at one of said two inputs.

4. The spatial light modulator as specified in claim 3 wherein said fused circuit comprises a network of interconnected fuses, one said fuse being associated with each said logic cell, whereby blowing one said fuse causes said mapping circuit to bypass a defective said memory cell and incorporate a known operable said memory cell.

5. The spatial light modulator as specified in claim 4 wherein one said fuse is associated with each row of said memory cells, whereby blowing one said fuse disables said associated row of memory cells.

6. The spatial light modulator as specified in claim 5 comprising primary said memory cells and spare said memory cells associated with said picture elements, with one said fuse being associated with each said spare memory cell, whereby blowing one said fuse connects said associated spare memory cell to said associated picture element.

7. The spatial light modulator as specified in claim 6 wherein one said spare memory cell is associated with a plurality of said primary memory cells.

8. The spatial light modulator as specified in claim 7 wherein one said primary memory cell is associated with a plurality of said picture elements.

9. The spatial light modulator as specified in claim 6 wherein said picture elements comprise a deflectable micromirror positioned over said memory cells, said micromirrors operable to deflect as a function of a content of an associated said memory cell.

10. The spatial light modulator as specified in claim 6 whereby said mapping circuit reconfigures mapping of said address signals from said addressing means to said memory cells when said spare memory cell is implemented.

11. A spatial light modulator, comprising;
   a) an array of picture elements;
   b) a plurality of primary memory cells associated with and controlling said picture elements;
   c) at least one spare memory cell; and
   d) memory cell formatting circuit means associated with said primary memory cells and said spare memory cells for selectively implementing one said spare memory cell in place of one said primary memory cell and functionally disabling said replaced primary memory cell, wherein said memory cell formatting circuit means comprises a network of fuses and a mapping circuit responsive to said network of fuses, said network of fuses comprising a series of fuses connected to ground on one end, and connected to a switch at the other end, said switch providing a potential to said series of fuses only when said spare memory cell is implemented, said series of fuses conducting substantially no current when said spare memory cells are not implemented.

12. The spatial light modulator as specified in claim 11 wherein said network of fuses conducts substantially no current when said spare memory cells are implemented.

13. The spatial light modulator as specified in claim 11 wherein each said spare memory cell is associated with a plurality of said primary memory cells.

14. The spatial light modulator as specified in claim 11 wherein one said fuse is associated with each said primary memory cell.

15. The spatial light modulator as specified in claim 11 wherein one said fuse is associated with each said spare memory cell.

16. The spatial light modulator as specified in claim 11 wherein said picture elements comprise a deflectable micromirror positioned over said primary memory cells and operable to deflect as a function of a content of an associated said primary memory cell.

17. The spatial light modulator as specified in claim 11 wherein said primary memory cells and said spare memory cells are arranged in an array with each said spare memory cell associated with and positioned proximate a group of adjacent said primary memory cells.

18. The spatial light modulator as specified in claim 17, wherein said network of fuses is positioned lateral of said array of memory cells.

19. The spatial light modulator as specified in claim 11, wherein said fuse network includes a logic circuit controlling which primary memory cells are utilized as a function of which said fuses are blown.

20. A memory cell, comprising:
  a) a plurality of memory cells arranged in rows;
  b) memory cell addressing means for generating row address signals; and
  c) a mapping circuit coupled between said addressing means and said memory cell rows for selectively determining which subset of said memory cell rows are addressed by said row address signals, said mapping circuit having a separate logic cell associated with each said memory cell row, each said logic cell having two inputs receiving two of said row address signals and an output driving said associated memory cell row.

21. A memory cell array, comprising;
  a) an array of primary memory cells arranged in rows;
  b) at least one row of spare memory cells; and
  c) memory cell formatting circuit means associated with said primary memory cells and said spare memory cells for selectively implementing one said spare memory cell row in place of one said primary memory cell row and functionally disabling said replaced primary memory cell row, wherein said memory cell formatting circuit means comprises a mapping circuit responsive to a network of fuses, said network of fuses comprising a series of fuses connected to ground, on one end, and connected to a switch at the other end, said switch providing a potential to said series of fuses only when said spare memory cell is implemented, said series of fuses conducting substantially no current when said spare memory cells are not implemented.

* * * * *